United States Patent [19]

Lewis

[11] Patent Number: 5,232,503
[45] Date of Patent: Aug. 3, 1993

[54] APPARATUS FOR EVAPORATIVELY COATING OBJECTS WITH A PREDETERMINED THICKNESS PROFILE

[75] Inventor: Paul E. Lewis, San Jose, Calif.
[73] Assignee: San Jose Technology, San Jose, Calif.
[21] Appl. No.: 773,026
[22] Filed: Oct. 7, 1991
[51] Int. Cl.$^5$ .................................................. B05C 3/09
[52] U.S. Cl. .................................... 118/421; 118/428; 118/429; 427/430.1; 427/256
[58] Field of Search .............. 118/421, 428, 429, 400; 427/256, 430.1

[56] References Cited

U.S. PATENT DOCUMENTS

| | | | |
|---|---|---|---|
| 1,258,071 | 3/1918 | Winter | 118/421 |
| 2,515,489 | 7/1950 | Borushko | 118/429 |
| 3,121,646 | 2/1964 | Smart | 118/421 |
| 3,783,312 | 6/1973 | Padjen et al. | 118/421 |
| 3,851,662 | 12/1974 | Jessop | 118/429 |
| 4,306,168 | 7/1977 | Laliberte | 118/421 |
| 4,418,641 | 12/1983 | Nakashima et al. | 118/429 |
| 4,597,931 | 7/1986 | Watanabe et al. | 118/421 |
| 4,779,562 | 10/1988 | Ono | 118/421 |
| 4,840,821 | 6/1989 | Miyazaki et al. | 118/421 |

FOREIGN PATENT DOCUMENTS

| | | | |
|---|---|---|---|
| 355060 | 7/1961 | Switzerland | 118/421 |
| 1475726 | 4/1989 | U.S.S.R. | 118/428 |

Primary Examiner—W. Gary Jones
Assistant Examiner—Todd J. Burns
Attorney, Agent, or Firm—Roger S. Borovoy

[57] ABSTRACT

An evaporative coating apparatus in which a coating liquid drains under gravity from the bottom of a processing tank through a metering valve and a pipe into a supply tank. The apparatus includes a supply tank for providing a supply of coating liquid; a processing tank for receiving the object to be coated having (1) an outlet for the coating liquid positioned in the lower part of the processing tank, and (2) at least one wall shaped to provide a substantially parabolic relationship between the surface area of the coating liquid in the processing tank and the hydrostatic head between the coating liquid in the processing tank and the coating liquid in the supply tank, whereby the level of the coating liquid in the processing tank decreases at a substantially constant rate; and a means for passing the coating liquid from the outlet in the processing tank to the supply tank.

26 Claims, 5 Drawing Sheets

APPARATUS FOR EVAPORATIVELY COATING OBJECTS WITH A PREDETERMINED THICKNESS PROFILE

BACKGROUND OF THE INVENTION

One of the final steps in the manufacture of magnetic recording disks used in fixed disk drives, after the disks have been coated with magnetic material, is to coat the disk with a lubricant, such as a perfluorinated polyether. The coating of lubricant protects the magnetic material and provides lubrication to minimize abrasion of the disk if a magnetic recording head accidentally or, on start up, contacts the disk. In such an event, the coating of lubricant substantially prevents loss of magnetic material (and the data stored therein) and minimizes friction between the head and the disk.

For recording and reading reliability, it is essential that the thickness of the coating of lubricant be very small so as not to increase substantially the distance between the head and the magnetic material. It is also essential that the thickness of the coating of lubricant be very uniform. Attempts have been made to achieve these goals by using conventional equipment which includes a processing tank which holds multiple disks in place as a liquid is pumped into and fills the processing tank to coat the disks with the lubricant. Typically, the liquid is discharged from the processing tank either by being pumped out or forced out under external pressure. Such action causes turbulence in the liquid and other detrimental effects which cause the coating of lubricant to be non-uniform across the disks. Other attempts to solve this problem involve placing the disks in the tank, filling the tank with a liquid including the lubricant and then gradually withdrawing the disks from the tank at a uniform rate. Any jerkiness in the withdrawal mechanism causes non-uniformity in the deposited coating.

The coating apparatus of this invention overcomes the shortcomings of the prior art approaches. This apparatus includes a processing tank and a supply tank below the processing tank for supplying a coating liquid to the processing tank for coating a plurality of substrates placed vertically in the processing tank for the duration of the coating process. After the substrates are placed in the processing tank, the processing tank is filled with the coating liquid. For coating magnetic disks, the coating liquid is a solution of a lubricant, such as a perfluorinated polyether, in a solvent, such as a chlorofluorocarbon, for example, Freon ™. Other applications may use a solution of a different coating material in a suitable solvent. In addition, the apparatus can be used with other forms of the coating liquid which may or may not include a solvent, such as a suspension or a slurry.

The coating of the disks occurs while the coating liquid drains from the processing tank by gravity, rather than being pumped out or forced out under pressure. During the draining process, none of the powered parts of the apparatus is operating, which eliminates vibrations that could cause waves on the coating liquid surface in the processing tank, which may lead to non-uniformity in the thickness of the lubricant coating. Coating liquid drains from the processing tank through an orifice in the bottom of the tank, through a metering valve and a pipe back into the supply tank.

The thickness of the lubricant coating is determined by the rate at which the coating liquid surface in the processing tank drops: the slower the drop rate, the thinner the coating. The coating thickness uniformity is determined by the uniformity of the rate at which the coating liquid surface in the processing tank drops. In a rectangular or cylindrical processing tank, that rate decreases as the processing tank empties, because the hydrostatic pressure, caused by the "head" of coating liquid (the vertical height of coating liquid in the tank), that drives the draining process decreases as the processing tank empties. Thus, a rectangular or cylindrical processing tank produces disks that have too thick a coating over the part of the disk that was uppermost in the processing tank, and too thin a coating over the part of the disk that was lowermost in the processing tank.

Prior art apparatus attempted to achieve a uniform coating thickness by inclining one of the side walls of the processing tank about 40°-50° to the vertical, and by giving the inclined wall a concave shape. This made the processing tank narrower towards the bottom of the tank, which reduced the surface area of the coating liquid towards the bottom of the tank. With this arrangement, the volume of coating liquid that was required to drain from the processing tank to decrease the level of the coating liquid surface in the tank by, for example, 1 mm, was smaller near the bottom of the tank than near the top of the tank. Reducing the surface area of the coating liquid in the tank towards the bottom of the tank compensated for the lower rate of coating liquid flow towards the bottom of the tank. This shape of the processing tank of the prior art provided an approximation to a constant rate of drop of the coating liquid surface in the tank. However, total coating uniformity was still a problem.

The processing tank of the prior art, with a concave inclined side wall, gave an acceptably uniform coating thickness only if the maximum total cross sectional area of the disks being coated was small compared with the cross sectional area of the processing tank at the same level of the coating liquid surface as that at which the disks (together with the fixture that held the disks in the processing tank) had their maximum cross sectional area. If this cross sectional area relationship was not small, the rate at which the level of the coating liquid surface dropped increased, and hence the coating thickness increased as the cross sectional area of the disks and fixture a the surface level of the coating liquid increased. To give an acceptably uniform coating thickness without using an excessively large processing tank, the inclined concave wall of the processing tank was given one or more protuberances coinciding with the vertical location of the disks and fixture, to compensate for the displacement of coating liquid caused by the disks and fixture, and to restore an acceptably constant rate of drop of the coating liquid surface level. Determining the optimum shape for the inclined wall of the processing tank of the prior art apparatus required considerable experimentation, and the result obtained was necessarily only an approximation to a truly uniform coating thickness.

For a number of reasons, it is desirable to improve the uniformity of the evaporative coating process. Rigid disks for digital data storage are constantly being made smaller, with a resulting increase in data density and reduction in bit area. The smaller bit size requires that a thinner coating of lubricant be used to prevent spacing losses from reducing the output from the record/reproduce head. With a thinner coating thickness, better uniformity is required to ensure that there are no uncoated areas on the disk. There are other applications for uniform evaporative coatings including the application of a soluble form of polytetrafluoroethylene (PTFE), sold under the trademark Teflon ® AF. The evaporative coating of the invention can be used to deposit on objects a very thin layer of PTFE having a uniformity that was impossible with previously known techniques. Evaporatively coating semiconductor wafers with a thin layer of PTFE of uniform thickness enables the PTFE layer to act as an etch resist in the manufacture of integrated circuits. Evaporatively coating a metal foil with a thin, uniform layer of PTFE allows the unique dielectric and insulating properties of PTFE to be exploited in capacitors, multilayer printed circuit boards and other electronic components. Evaporatively coating objects with a thin layer of PTFE enables the lubricating properties of PTFE to be exploited, for instance, the muzzle velocity and hence the range of ammunition can be substantially increased by a PTFE coating. PTFE coated ammunition also increases the service life of the barrels of guns firing such ammunition.

Many of the potential applications for evaporative coating involve objects having considerably more complex shapes than rigid magnetic storage disks. Moreover, evaporative coating processes use fluorocarbon and chlorofluorocarbon solvents, many of which are regarded as environmental hazards. The use of such solvents can be minimized (and hence the hazards of using such solvents reduced) by using processing tanks that are not substantially larger than the object or objects to be coated. Coating complex objects in tanks that are not significantly larger than the objects themselves make it difficult to obtain a uniform coating thickness.

To simplify the following explanation of the invention, the phrase "object to be coated" will refer to a single object or a plurality of objects that are to have a coating evaporatively deposited on them, together with the fixture (if any) used to support the object(s) in the processing tank. The term "cross sectional area" will mean a cross sectional area measured in the plane of the coating liquid surface in the processing tank, unless otherwise stated. The term "level of the coating liquid" means the distance of the coating liquid surface measured vertically from an arbitrary reference point. The term "every level of the coating liquid" means every level of the coating liquid at which the coating liquid surface contacts the object or objects that are part of the object to be coated.

SUMMARY OF THE INVENTION

It has now been discovered that, in an evaporative coating apparatus in which a coating liquid drains under gravity from the bottom of a processing tank through a metering valve and a pipe into a supply tank, a very uniform coating thickness can be obtained by maintaining throughout the draining process a parabolic relationship between the surface area of the coating liquid in the processing tank and the hydrostatic pressure caused by the head of coating liquid that drives the draining process. That hydrostatic pressure will hereinafter be called the "hydrostatic head". At any coating liquid level in the processing tank, the surface area is the cross sectional area of the processing tank at that level minus the cross sectional area of the object to be coated, also at that level. At any coating liquid level, the hydrostatic head is the difference between the actual coating liquid level in the processing tank and the effective level of the coating liquid in the supply tank. Preferably a constant effective coating liquid level is provided in the supply tank, such as by providing a weir in the supply tank, simplifies calculating the hydrostatic head because a change in the hydrostatic head is determined only by change in the level of the coating liquid in the processing tank. However, the coating liquid level in the supply tank can rise as the coating liquid level in the processing tank drops, if desired.

Briefly, the apparatus of the invention for evaporatively coating an object with a coating of a substantially constant thickness includes a supply tank for providing a supply of coating liquid; a processing tank for receiving the object to be coated, the processing tank having (1) an outlet for the coating liquid positioned in the lower part of the processing tank, and (2) at least one wall shaped to provide a substantially parabolic relationship between the surface area of the coating liquid in the processing tank and the hydrostatic head between the coating liquid in the processing tank and the coating liquid in the supply tank, whereby the level of the coating liquid in the processing tank decreases at a substantially constant rate; and a means for passing the coating liquid from the outlet in the processing tank to the supply tank.

In the apparatus of this invention, the processing tank or, more commonly, one wall of the processing tank, for a given object to be coated, is shaped so that when the coating liquid drains out of the processing tank, there is, at all levels of the coating liquid, a parabolic relationship between the surface area of the coating liquid in the processing tank and the hydrostatic head that drives the draining process.

The basic requirement of a parabolic relationship between the surface area of the coating liquid and the hydrostatic head can be met if the processing tank has a parabolic cross section in the vertical plane, or has one or more parabola-shaped walls. Such a tank will be from now on be referred to as a "tank with a parabola-shaped wall". However, the placement of an object to be coated in a tank that, without the immersed object, meets the parabolic relationship, destroys the parabolic relationship, although if the maximum cross sectional area of the object to be coated is small compared with the cross sectional area of the tank at the level of the coating liquid at which the object has its maximum cross sectional area, an acceptable approximation still may be obtained.

The processing tank with a parabola-shaped wall is the starting point for the shape of a processing tank that will meet the required relationship with an object to be coated in the tank. To meet the required relationship, one or more of the walls of the tank is moved outward from the center of the tank to increase the cross-sectional area of the tank by the cross sectional area of the object to be coated. This increased cross sectional area of the processing tank accommodates the coating liquid displaced by the object to be coated, and maintains the required parabolic relationship between the surface area of the coating liquid and the hydrostatic head.

When the object to be coated has substantially the same cross sectional area at all levels of the coating liquid, only a single measurement or calculation of its cross sectional area need be made. In a processing tank for coating such an object, the position of one or more of the walls of the tank is moved outward by the distance required to increase the cross-sectional area of the tank by the cross sectional area of the object. Since the cross sectional area of the object is the same at all levels of the coating liquid, the distance by which the one or more walls of the parabola-shaped wall is moved outward also is the same at all levels of the coating liquid. Preferably, one or more of the vertical walls of the tank is moved outward when the object has substantially the same cross sectional areas at all levels of the coating liquid.

When the object to be coated has a cross sectional area that is different at different levels of the coating liquid, a number of measurements of its cross sectional area need be taken, the number depending on the geometric complexity of the object and the uniformity of the coating thickness required. In a processing tank for coating such an object, the position of one or more of the walls of the tank, preferably the parabola-shaped wall, is moved outward by the distance required to increase the cross-sectional area of the tank by the cross sectional area of the object. Since the cross sectional area of the object is different at different levels of the coating liquid, the distance by which the one or more walls of the tank is moved outward changes with the level of the coating liquid.

The resulting wall shape may be complex, depending on the geometric complexity of the object to be coated. For example, at the beginning of the draining process, when the disks are completely immersed below the surface of the coating liquid, the cross-sectional area of the disks has no effect upon the surface area. As the surface drops so the top of the disks are exposed, the effective disk area increases to a maximum as the surface level lowers, and decreases back to zero as the level drops below the disks. A tank for coating such disks would have a parabola-shaped wall with a bulge in it, the maximum of the bulge coinciding with the vertical position of the centers of the disks. Additionally, the bulge may have irregularities caused by the need to compensate for the surface area occupied by the fixture locating the disks in the processing tank.

The shape of a processing tank described above has to be designed for a specific object to be coated. This restriction is acceptable when a product is produced in a volume sufficient to occupy at least one coating machine full time, but is inconvenient if one coating machine has to be used to coat several different lower-volume products, or if different sizes of the same product have to be coated. The basic processing tank with a parabola-shaped wall can be adapted so that it can be quickly changed over from coating one type of object to another. By adding a shaped displacement device to the processing tank, the processing tank can be used to provide a uniform coating thickness on any object to be coated having a maximum cross-sectional area less than the defined cross sectional area for which the tank is designed. The shape of the displacement device is such that, at all levels of the coating liquid in the processing tank, the sum of the cross sectional areas of the object and the displacement device is equal to the defined cross sectional area for which the processing tank is designed. Changing over from coating a first type of object to a second type requires removing the displacement device for the first type of object from the tank, and replacing it with one for the second type of object. Alternatively, the displacement device can form part of the fixture used for locating the object in the tank. This approach has the advantage of ensuring that the displacement device is accurately located relative to the object to be coated.

The discovery of the parabolic relationship required to obtain a uniform coating thickness also serves as a starting point for constructing evaporative coating apparatus that can provide a coating thickness that varies according to a predetermined profile as the coating liquid drains from the processing tank. For instance, it may be desirable that the thickness of a PTFE coating on an artillery shell increase towards the rear of the shell. Such a profile may be obtained by standing the shell vertically on its tail in the processing tank, and by causing the rate at which the coating liquid surface drops to accelerate during the draining process. This can be done in one of two ways. First, the shell is placed in a processing tank that has a shaped parabolic wall designed to produce a constant coating thickness on the shell. To obtain an increasing coating thickness toward the rear of the shell, the vertical offset between the processing tank and the supply tank is increased relative to the vertical offset for which the shape of the processing tank is designed. The increased offset causes the coating liquid surface in the processing tank to accelerate during the draining process. Reducing the vertical offset to less than the design offset causes the coating liquid surface in the processing tank to decelerate during the draining process, which reduces the coating thickness towards the rear of the shell.

Changing the vertical offset between the processing tank and the supply tank causes the coating thickness to increase or decrease progressively according to a parabolic law. More complex coating thickness profiles (such as alternating bands of greater and lesser thickness) can be obtained using the second alternative in which the shape of the parabolic wall or displacement device that gives a constant coating thickness on the object to be coated is selectively changed to increase or decrease the surface area of the coating liquid in the tank relative to that required to give a constant coating thickness. Increasing the surface area decreases the rate of drop of the coating liquid surface and decreases the coating thickness. Reducing the surface area increases the rate of drop of the coating liquid surface and increases the coating thickness. Changes in surface area can be abrupt or gradual to produce the desired coating thickness profile. Applying the applicant's parabolic law to apparatus for providing a coating with a varying thickness enables the processing tank or displacement device geometry required to produce a given coating thickness profile to be easily calculated. A processing tank or displacement device designed according to the parabolic law enables the thicknesses of the regions of different coating thickness to be accurately controlled and to have a high degree of uniformity from one coated object to another.

DETAILED DESCRIPTION OF THE INVENTION

Figure 1:
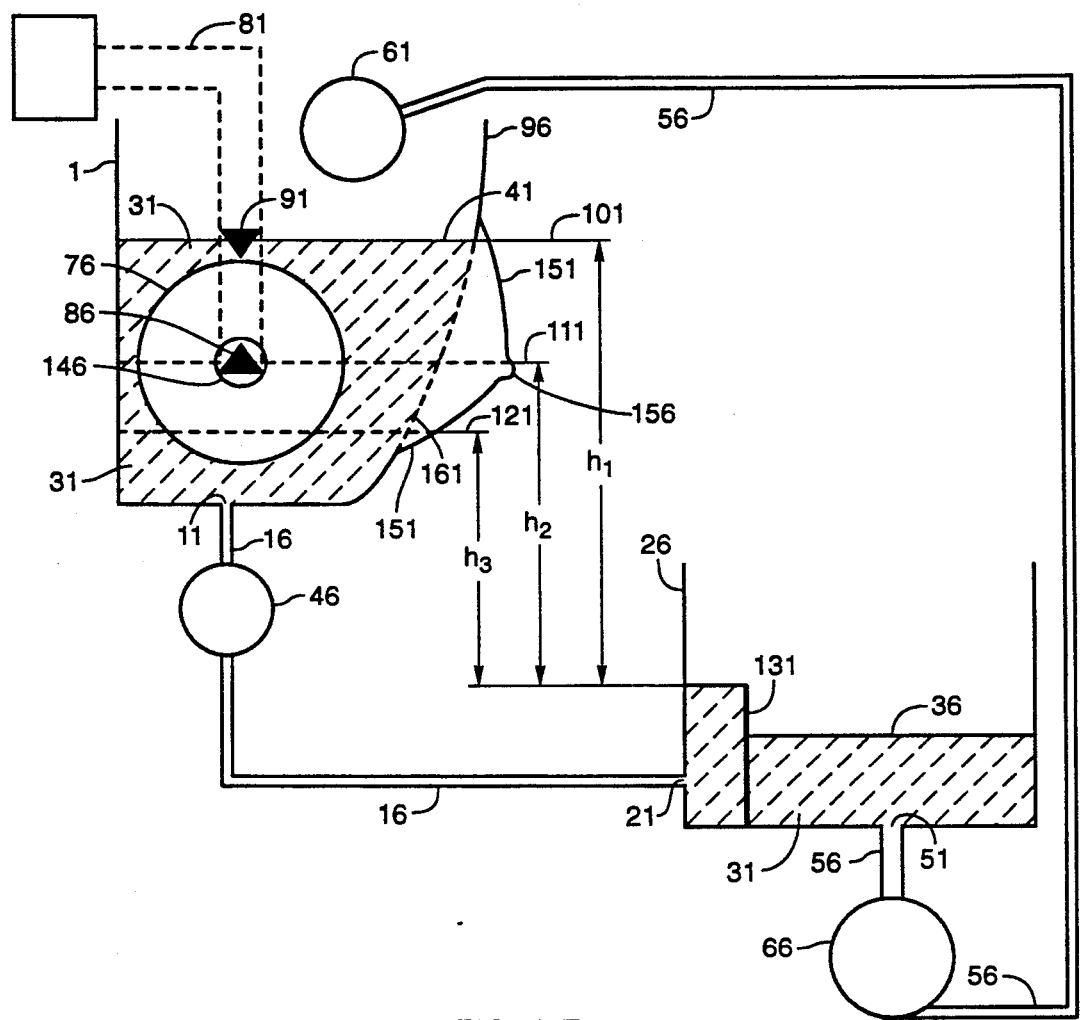
FIG. 1 is a schematic cross section of the preferred embodiment of an evaporative coating apparatus according to the invention for providing a coating having a uniform thickness.

FIG. 1 is a schematic cross section of an evaporative coating apparatus embodying the invention. Processing tank 1 is mounted above supply tank 26. In the preferred embodiment, processing tank 1 has a substantially rectangular cross-section from top to bottom, although other shapes are possible, except for the shape of one side, to be discussed later. Processing tank 1 has orifice 11 in its bottom or low on one of its side walls. Pipe 16 connects orifice 11 to orifice 21 in supply tank 26. Orifice 21 may be located in the bottom or low on one side of supply tank 26, which contains coating liquid 31. In the preferred embodiment, supply tank 26 is substantially rectangular, although other shapes are possible. Orifice 21 must be located below the minimum level of the surface 36 of coating liquid 31 to prevent air from entering pipe 16 and causing waves on the surface 41 of the coating liquid in processing tank 1.

Metering valve 46 located in pipe 16 controls the flow of coating liquid from processing tank 1 to supply tank 26. Metering valve 46 has three operating positions: CLOSED, in which position it prevent coating liquid from draining from processing tank 1 to supply tank 26; OPEN in which position it allows coating liquid to drain freely from processing tank 1 to supply tank 26; and METER, in which position it allows coating liquid to drain from processing tank 1 to supply tank 26 at a pre-determined rate.

Supply tank 26 has a second orifice 51 in its bottom or low in one of its sides. Pipe 56 interconnects orifice 51 and spray bar 61 mounted at the top of processing tank 1. Pump 66 is connected in pipe 56 and, when operating, rapidly transfers coating liquid from supply tank 26 to fill processing tank 1. Processing tank 1 and supply tank 26 are fitted with cooling coils and vapor tight lids (not shown) to permit the recovery of solvent evaporating from coating liquid 31 and to prevent such solvent from escaping into the atmosphere. The airspace above the coating liquid in processing tank 1 and in supply tank 26 is interconnected with an air pipe (not shown) to ensure that the same air pressure exists above coating liquid 31 in both tanks. Processing tank 1, supply tank 26, pipes 16 and 56, metering valve 46, spray bar 61, pump 66, and their associated controls and connections are all mounted on a suitable frame (not shown). The frame may include vibration dampers if such dampers are required to prevent vibrations in the floor on which the apparatus stands from causing waves on the surface of coating liquid 31 in processing tank 1.

FIG. 1 shows the evaporative coating apparatus with the object to be coated 76 in position in the processing tank. As an example, the object to be coated is a plurality of magnetic recording disks 76 mounted vertically in fixture 81. Fixture 81 has a first contact arm 86 that contacts the disks through their center holes, and a second contact arm 91 that contacts the disks at the upper-most point of their peripheries. Fixture 81 holds disks 76 steady during the coating process, and ensures that each time a batch of disks 76 is loaded into processing tank 1, disks 76 have a consistent and repeatable vertical location relative to processing tank 1.

Valve 46 is set to its OPEN position, and pump 66 is activated. Coating liquid sprays out of spray bar 61 and directly or indirectly, through reflection from the walls of processing tank 1, wets the entire surface of disks 76 substantially simultaneously. The spray of coating liquid also washes any dirt or contamination off the surface of disks 76. With pump 66 still running, valve 46 is set to its CLOSED position and processing tank 1 fills with coating liquid to a level that fully immerses disks 76. Alternatively, processing tank 1 can be filled by pumping coating liquid directly into the tank through an orifice located near the bottom of the tank, and allowing the level of the coating liquid to rise progressively up disks 76. Alternatively, disks 76 may be lowered in fixture 81 into the tank after the tank after it has been filled. These alternatives lack the cleansing action of spray filling, and do not wet the entire surface of disks 76 substantially simultaneously. Thus, filling tank 1 from spray bar 61 is preferred.

After a delay of 10 seconds up to a minute or more, to allow vibrations caused by the processing tank filling process to die down, metering valve 46 is set to its METER position. This allows coating liquid 31 to drain out of processing tank 1 into supply tank 26. The shape of processing tank 1 is selected so that the level of coating liquid 31 in tank 1 falls at a constant velocity despite the presence of the object to be coated and the reduction in hydrostatic head that occurs as the coating liquid level falls. As the coating liquid level falls, a uniform thickness of coating is deposited on the object to be coated. Typically, the surface of coating liquid 31 in processing tank 1 falls at between 2 and 4 inches per minute (50–100 mm/minute) during the draining process. After all of coating liquid 31 has drained from processing tank 1, the coated disks 76 are removed from processing tank 1 by means of fixture 81, and the apparatus is ready to start the coating process again.

Figure 3:
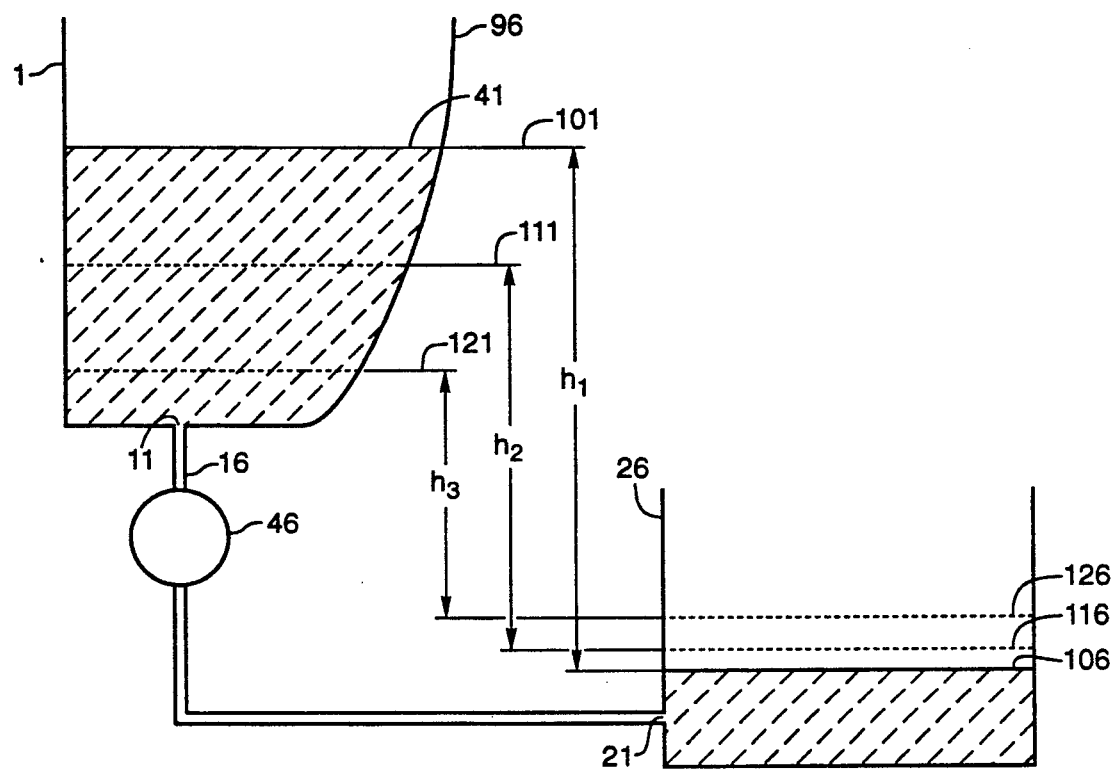
FIG. 3 shows a schematic cross section of an evaporative coating apparatus of the invention for providing a coating having a uniform thickness on small objects to be coated, or on objects to be coated having a constant cross sectional area.
Figure 4A:
FIG. 4(a) shows a horizontal cross section of the processing tank in FIG. 3 at surface level 101.

Processing tank 1 includes curved side-wall 96 which, according to the invention, is parabola-shaped so that when coating liquid 31 drains from processing tank 1, there is maintained throughout the drainage process a parabolic relationship between the surface area of coating liquid 31 in tank 1 and the hydrostatic head driving the draining process. Referring now to FIG. 3, there is no object to be coated in processing tank 1, and side-wall 96 has a pure parabola shape. Processing tank 1 is filled with coating liquid 31 to the level indicated by numeral 101. In this condition, the surface area of coating liquid 31 in processing tank 1 is indicated by the shaded area $A_1$ in FIG. 4(a), and the hydrostatic head driving the draining process is the difference between the level 101 of coating liquid 31 in processing tank 1 and the level 106 of coating liquid 31 in supply tank 26, indicated by the dimension $h_1$ in FIG. 3.

Figure 4B:
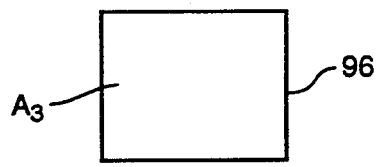
FIG. 4(b) shows a horizontal cross section of the processing tank in FIG. 3 at surface level 111.

After metering valve 46 is set to its METER position, coating liquid 31 drains out of processing tank 1. During the draining process, the surface 41 of coating liquid 31 in processing tank 1 reaches the level designated by numeral 111. At this point in the draining process, coating liquid 31 in supply tank 26 has risen to the level designated by the dashed line bearing numeral 116, and the surface area of coating liquid 31 in processing tank 1 is reduced, as indicated by the area $A_2$ in FIG. 4(b), and the hydrostatic head driving the draining process is the difference between the level 111 of coating liquid 31 in processing tank 1 and the level 116 of coating liquid 31 in supply tank 26, indicated by the dimension $h_2$ in FIG. 3. Because head $h_2$ is less than head $h_1$, the hydrostatic pressure driving the draining process is less and the rate of flow of coating liquid 31 from processing tank 1 is reduced. However, decreasing the cross sectional area of processing tank 1 to $A_2$ at level 111 reduces the volume of coating liquid 31 that must drain from processing tank 1 to provide a given drop in the level of coating liquid 31 in processing tank 1. If area $A_2$ is related to area $A_1$ by the parabolic relationship $A_1/A_2 = \sqrt{(h_1/h_2)}$, the rate at which the level of coating liquid 31 in processing tank 1 drops at level 111 will be the same as the rate at which it dropped at level 101.

Figure 4C:
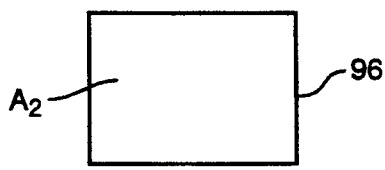
FIG. 4(c) shows a horizontal cross section of the processing tank in FIG. 3 at surface level 121.

Later in the draining process, the surface 41 of coating liquid 31 in processing tank 1 reaches the level designated by numeral 121. At this point in the draining process, the surface of coating liquid 31 in supply tank 26 has risen to the level designated by numeral 126, the surface area of coating liquid 31 in processing tank 1 is further reduced, as indicated by the shaded area $A_3$ in FIG. 4(c), and the hydrostatic head driving the draining process is the difference between level 121 of coating liquid 31 in processing tank 1 and level 126 of coating liquid 31 in supply tank 26, indicated by the dimension $h_3$ in FIG. 3. Because head $h_3$ is less than head $h_2$, the hydrostatic pressure driving the draining process is further reduced, and the rate of flow of coating liquid 31 from processing tank 1 is also further reduced. However, decreasing the cross sectional area of processing tank 1 to $A_3$ reduces further the volume of coating liquid that must drain from processing tank 1 to provide a given drop in the level of coating liquid 31 in processing tank 1. If area $A_3$ is related to area $A_1$ by the parabolic relationship $A_1/A_3 = \sqrt{(h_1/h_3)}$, the rate at which the level of coating liquid 31 in processing tank 1 at level 121 is the same as the rate at which it dropped at level 101 and at level 111.

The rate at which coating liquid 31 in the processing tank 1 drops will remain constant throughout the draining process if the shape of processing tank 1 is designed such that at every level of coating liquid 31 in processing tank 1, at which the level of the hydrostatic head is $h_x$, the cross sectional area, $A_x$, of processing tank 1 at that level is related to the cross sectional area, $A_1$, of processing tank 1 at the start of the draining process by the relationship $A_1/A_x = \sqrt{(h_1/h_x)}$, where $h_1$ is the hydrostatic head at the start of the draining process. Note that it is only necessary to maintain this relationship over the range of levels of coating liquid 31 in which the surface of coating liquid 31 contacts the object or objects that are being coated. FIG. 3 shows processing tank 1 with parabola-shaped wall 96 which meets the criterion stated above. However, there is no requirement that only one wall of processing tank 1 be shaped. More than one wall of the tank may be shaped provided that the surface area of the coating liquid in the tank is related to the hydrostatic head according to the above relationship.

FIG. 5 shows alternative versions of supply tank 26 that simplify the design of processing tank 1 by providing a constant effective level for coating liquid 31 in supply tank 26. This enables the effect of coating liquid 31 draining into supply tank 26 from processing tank 1 on the level of coating liquid 31 in supply tank 26 to be ignored when calculating the hydrostatic head. Compared with the version of supply tank 26 shown in FIG. 3, the alternative versions of supply tank 26 shown in FIG. 5 also effectively decouple the mass of coating liquid 31 in processing tank 1 from the mass of coating liquid 31 in supply tank 26. Without such decoupling, oscillations can occur that cause waves on the surface of coating liquid 31 in processing tank 1, which may give a non-uniform coating thickness.

Figure 5A:
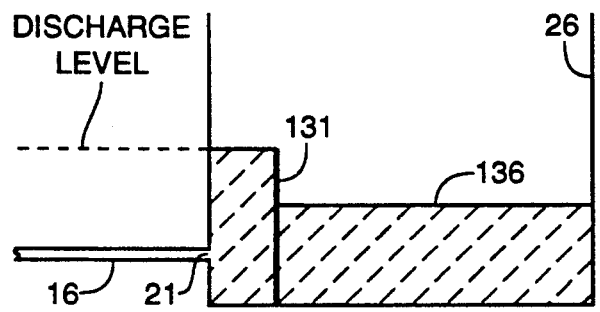
FIG. 5(a) shows a cross section of a supply tank fitted with a weir to provide a constant effective level of the coating liquid in the tank.

In FIG. 5(a), which shows the preferred embodiment of supply tank 26, weir 131 surrounds orifice 21. At the start of filling processing tank 1, when metering valve 46 (FIG. 3) is in its OPEN position, coating liquid runs through pipe 16, fills the space formed around orifice 21 by weir 131 and runs over weir 131. During the draining process, when metering valve 46 is in its METER position, the coating liquid draining through pipe 16 and continues to run over weir 131. Provided that the surface 136 of the coating liquid in the part of supply tank 26 remote from orifice 21 does not exceed the level of the top of weir 131, the effective level of the coating liquid in supply tank 26 remains constant at a level equal to the level of the top of weir 131, and the hydrostatic head is measured relative to the level of the top of weir 131.

Figure 5B:
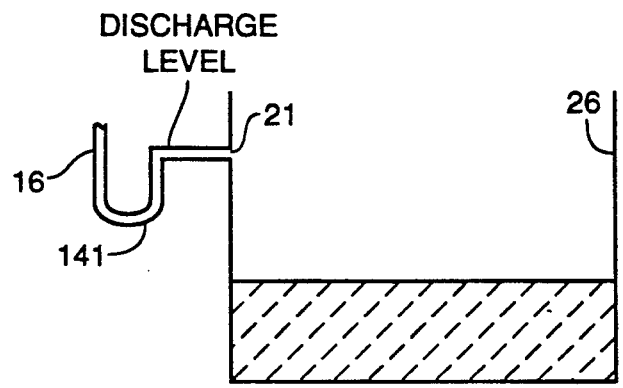
FIG. 5(b) shows a cross section of a supply tank in which the drain pipe from the processing tank discharged above the surface of the coating liquid in the tank via a U-bend to provide a constant effective level of the coating liquid in the tank.

In the alternative arrangement for achieving a constant effective level of coating liquid 31 in supply tank 26 shown in FIG. 5(b), pipe 16 discharges into the air space above coating liquid 31. Pipe 16 is fitted with U-bend 141 which fills with coating liquid during the initial stage of filling processing tank 1 (FIG. 3). This prevents air that would cause waves in processing tank 1 from passing from supply tank 26 up pipe 16 into processing tank 1 at the start of the draining process.

Referring to FIG. 1, an object to be coated is placed in processing tank 1 which occupies part of the cross-sectional area of the processing tank. This reduces the surface area of coating liquid 31, which increases the rate at which the level of coating liquid 31 in processing tank 1 must drop to supply a given volume of coating liquid to orifice 11 relative to when there is no object to be coated in the tank. An object to be coated having a constant cross sectional area will occupy an increasing fraction of the cross-sectional area of processing tank 1 as the draining process proceeds, so not only does surface 41 of coating liquid 31 drop faster at the start of the draining process, the rate of drop increases during the draining process, and therefore the coating thickness increases. Restoring the required constant rate of drop with an object to be coated having a constant cross sectional area requires only that the cross-sectional area of processing tank 1 be increased at all levels by the cross-sectional area of the object to be coated. This is achieved by moving any one of the side walls of processing tank 1, preferably one of the vertical side walls, outwards from the center of the tank by the amount required to give the required increase in cross sectional area. The increased cross sectional area of processing tank 1 restores the surface area of the coating liquid to that which is related to the hydrostatic head according to the parabolic relationship stated above.

A more common situation is shown in FIG. 1, in which the object to be coated has a non-constant cross-sectional area, i.e., a cross sectional area that is different at different levels of coating liquid 31. The object to be coated is a plurality of magnetic recording disks 76 mounted vertically in fixture 81. Fixture 81 has a first contact arm 86 that contacts disks 76 through their center holes 146, and a second contact arm 91 that contacts disks 76 at the upper-most point of their peripheries. Disks 76 and fixture 81 occupy part of the cross sectional area of processing tank 1 and cause the level 41 of coating liquid 31 to drop faster than when there is no object to be coated in processing tank 1. Moreover, because the cross-sectional area occupied by the object to be coated is different at different levels of coating liquid 31, the level of coating liquid 31 will drop at a varying rate, giving a non-uniform coating thickness. Restoring the required constant rate of drop requires that, at every level of coating liquid 31 in processing tank 1, the cross sectional area of processing tank 1 be increased by the cross sectional area of the object to be coated at that level. This is achieved by moving any one of the side walls of processing tank 1 out from the center of the tank by the amount required at every level to give the required increase in cross sectional area at that level. In the preferred embodiment, only the position of parabola-shaped wall 96 is moved. The increased cross sectional area at every level of coating liquid 31 in processing tank 1 restores the surface area of coating liquid 31 at that level to that which is related to the hydrostatic head according to the parabolic relationship stated above. Note that it is only necessary to maintain this relationship over the range of levels of coating liquid 31 in which the surface of coating liquid 31 contacts the object or objects that are part of the object to be coated, i.e., disks 76 in this example.

Figure 2A:
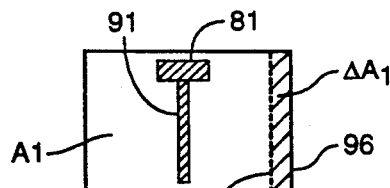
FIG. 2(a) shows a horizontal cross section of the processing tank in FIG. 1 at surface level 101.

FIGS. 1 and 2 illustrate how processing tank 1 with a single parabola-shaped wall 96 is adapted to accommodate an object to be coated having a cross sectional area that varies with the level of coating liquid 31. The parabola-shaped starting position of wall 96 is shown as broken line 161 in FIG. 1. When the surface 41 of coating liquid 31 in processing tank 1 is at the level indicated by numeral 101, i.e., at the start of the draining process, fixture 81 and second contact arm 91 occupy part of the area of surface 41 of coating liquid 31. The cross sectional area $A_1$ of these parts at the points at which they intersect surface 41 is determined by measurement or calculation. To restore the area of surface 41 of coating liquid 31 to the value required by the parabolic relationship, wall 96 is moved outwards so that the cross sectional area, $A_1$, of processing tank 1 at level 101 is increased by area $A_1$ (see FIG. 2(a)).

When the level of coating liquid 31 drops below level 101, disks 76 break the surface of coating liquid 31 and begin to occupy part of the area of surface 41. The part of the area of surface 41 occupied by disks 76 progressively increases as the level of coating liquid 31 drops, and the length of the chord described by surface 41 across the faces of disks 76 increases. This requires that wall 96 be moved progressively further from the center of the tank, forming bulge 151 which provides the progressively increasing cross sectional area for processing tank 1.

When the level of coating liquid 31 reaches the level of the center holes 146 of disks 76, the area of surface 41 occupied by disks 76 falls a little, but then first contact arm 86 begins to occupy part of the area of surface 41, requiring a further increase in the cross sectional area of processing tank 1. A second bulge 156 imposed on bulge 151 provides this additional cross sectional area.

Figure 2B:
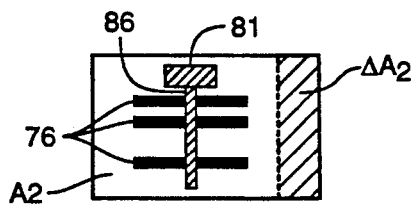
FIG. 2(b) shows a horizontal cross section of the processing tank in FIG. 1 at surface level 111.

When the level of coating liquid 31 reaches level 111, disks 76 (only part of a full load of disks is shown in FIG. 2(b)), fixture 81 and first contact arm 86 occupy part of the area of surface 41. The cross sectional area $A_2$ of these parts at the points at which they intersect surface 41 is determined by measurement or calculation. To restore the area of surface 41 of coating liquid 31 to the value required by the parabolic relationship at level 111, wall 96 is moved outwards so that the cross sectional area $A_2$ of the processing tank 1 at level 111 is increased by area $A_2$ (see FIG. 2(b)).

When the level of coating liquid 31 drops immediately below level 111, first contact arm 86 ceases to occupy part of the area of surface 41. This requires wall 96 to curve sharply inwards below bulge 156 to reduce the cross sectional area of processing tank 1. Below level 111, the surface area occupied by disks 76 progressively decreases as the level of coating liquid 31 drops, and the length of the chord described by surface 41 across the faces of disks 76 decreases. This requires that wall 96 be moved progressively back towards its original position, along line 151, to provide the progressively decreasing cross sectional area for processing tank 1.

Figure 2C:
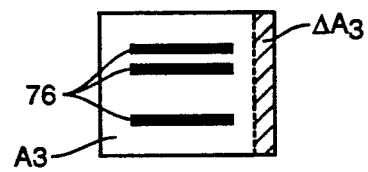
FIG. 2(c) shows a horizontal cross section of the processing tank in FIG. 1 at surface level 121.

When coating liquid 31 is at the level indicated by numeral 121, disks 76 (only part of a full load of disks is shown in FIG. 2(c)) occupy part of the area of surface 41. The cross sectional area $A_3$ of disks 76 at the points at which they intersect surface 41 is determined by measurement or calculation. To restore the area of surface 41 to the value required by the parabolic relationship at level 121, wall 96 is moved outwards so that the cross sectional area $A_3$ of processing tank 1 at level 121 is increased by area $A_3$ (see FIG. 2(c)).

In the above example, the cross sectional area of processing tank 1 is determined at only three points in the draining process. In a practical tank design, the cross sectional area of the object to be coated must be measured or calculated and the corresponding position of wall 96 determined at many points in the draining process. The number of points required is determined by the desired uniformity of the coating thickness and the rate of change of cross sectional area of the object to be coated. The accuracy in the vertical direction with which the object to be coated is positioned in processing tank 1 relative to the shaping of wall 96 also influences the uniformity of coating thickness that can be obtained.

Fabricating a processing tank with a wall having a complex shape can be an expensive process because such tanks must be individually made to accommodate a specific object to be coated. If the shape of the object to be coated is changed after its processing tank has been made, the tank may have to be scrapped and a new tank made. If a single evaporative coating apparatus is used to coat more than one type of object to be coated, the processing tank must be changed when the type of object to be coated is changed. During the change-over time, the apparatus cannot be used for production.

Figure 6:
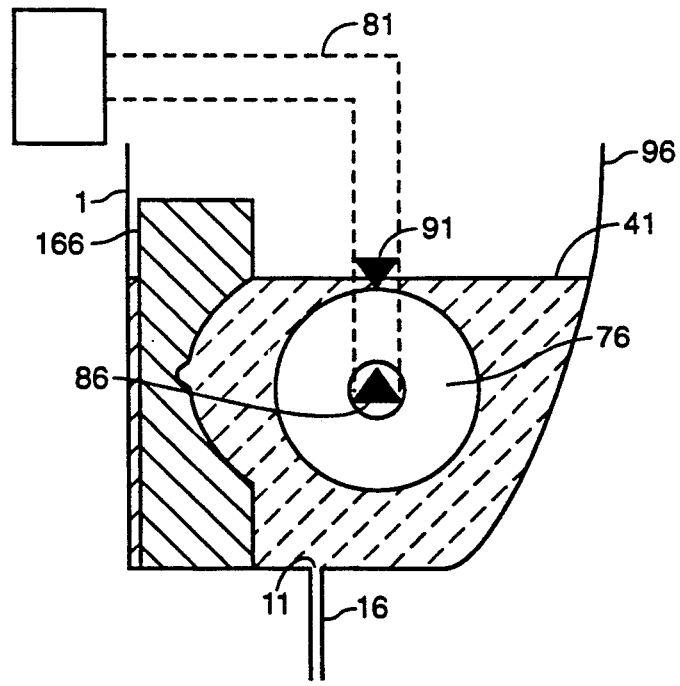
FIG. 6 shows a processing tank fitted with a displacement device according to the invention.

FIG. 6 shows a processing tank that enables the coating of a variety of types of objects to be coated. Processing tank 1 is designed to accommodate a hypothetical object to be coated having a defined constant cross sectional area. Thus, as previously described, wall 96 is preferably parabola-shaped, but other walls of the tank may be shaped provided that there is maintained at all levels of coating liquid 31 the basic parabolic relationship between the hydrostatic head and the surface area of the coating liquid, i.e., the difference between the cross sectional area of the processing tank and the cross sectional area of the hypothetical object to be coated having a constant cross sectional area. By adding shaped displacement device 166 to the processing tank, the same tank can be used to provide a coating of uniform thickness on any object to be coated having a maximum cross sectional area less than that of the hypothetical object to be coated for which the tank is designed. Displacement device 166 is shaped so that, at every level of coating liquid 31 in processing tank 1, the cross sectional area of displacement device 166 is equal to the difference between the cross sectional area of the hypothetical object to be coated for which the tank is designed and the cross sectional area of the object to be coated at that level. Thus, at every level of coating liquid 31, the object to be coated and the displacement device together occupy the cross sectional area of the hypothetical object to be coated that processing tank 1 was designed to accommodate. Note that it is only necessary to maintain this relationship over the range of levels of coating liquid 31 in which the surface of coating liquid 31 contacts the object or objects that are part of the object to be coated. The accuracy requirements to be taken into account when determining the shape of displacement device 166 are the same as those described above with respect to designing the shape of wall 96 for in a processing tank for accommodating an object to be coated having a cross sectional area that is different at different levels of coating liquid 31.

FIG. 6 shows the object to be coated, a plurality of magnetic recording disks 76 mounted in fixture 81 by means of first contact arm 86 and second contact arm 91. Magnetic recording disks are made with diameters of 5¼" (133 mm), 3½" (89 mm) and 2½" (63.5 mm). A processing tank that is optimized for 5¼" disks will not give an acceptable coating thickness uniformity with 2½" disks. However, a single tank of the type shown in FIG. 6 can be used to coat both diameters of disks with an acceptably uniform coating thickness if a displacement device optimized for 5¼" disks is used when 5¼" disks are being coated. When 2½" disks are to be coated, displacement device 166 optimized for 5¼" disks is removed from the tank and replaced with displacement device 166 optimized for 2½" disks, an operation that takes only a few seconds. A similar displacement device with different dimensions may be used for 3½" disks.

Displacement device 166 may also be attached to fixture 81, or may form part of fixture 81. This has the advantage that disfaces placement device 166 can be more accurately positioned relative to the object to be coated, which improves the accuracy of the relationship between the cross sectional area of displacement device 166 and the cross sectional area of the object to be coated. A further advantage of this approach is that it is easier to prevent objects from being coated using the wrong displacement device. Ways of fabricating a suitably shaped displacement device 166 are well known in the art and will not be described here.

In some applications, it may be advantageous to use a combination of a processing tank with a shaped wall and a displacement device. For instance, a displacement device may be used to adapt a custom-designed processing tank so that the tank can be used to coat a type of object to be coated that is similar to but different from the type of object to be coated that the tank was originally designed for.

The applicant's discovery of the parabolic relationship required to obtain a constant coating thickness also serves as a starting point for producing a coating thickness that changes according to a predetermined profile as the coating liquid drains from the processing tank. In all of the techniques for varying coating thickness to be described, coating thickness can only change on the axis along which the coating liquid drains from the processing tank. Since coating liquid drains from the tank under gravity, this axis is in the vertical direction. The object to be coated must therefore be placed in the processing tank such that the axis of the object along which it is desired to vary the coating thickness is vertical.

An apparatus designed to coat a given object to be coated with a constant thickness coating can be adapted to provide a coating thickness that changes progressively on the axis of the object along which the coating liquid drains by using a hydrostatic head different from that which gives a constant coating thickness. Increasing the hydrostatic head causes the coating thickness to increase during the draining process. Decreasing the hydrostatic head causes the coating thickness to decrease during the draining process. The change in coating thickness is determined by the difference between the hydrostatic head at the start of the draining process and the reference head, which is that hydrostatic head at the start of the draining process which gives a constant coating thickness. The hydrostatic head can be changed by carrying out the coating process with the processing tank, the supply tank or both in a vertical position different from that which gives a constant coating thickness. The hydrostatic head can also be changed by changing the height of weir 131 in supply tank 26 (FIG. 1). Increasing the height of weir 131 reduces the hydrostatic head.

Figure 7:
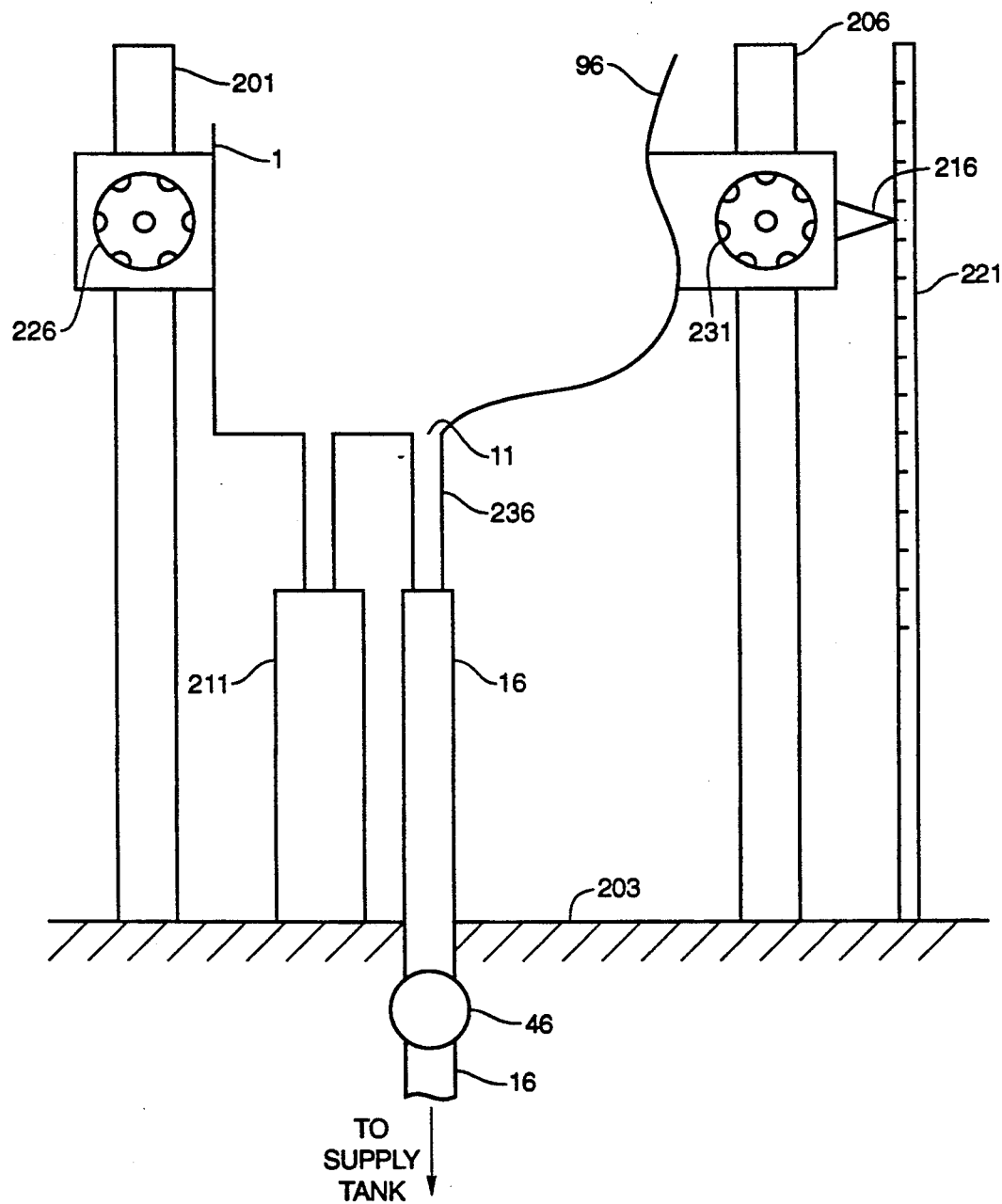
FIG. 7 shows a processing tank adapted to provide an adjustable hydrostatic head according to the invention.

FIG. 7 shows an adaptation of the apparatus of FIG. 1 to provide a progressively increasing or decreasing coating thickness. Processing tank 1 is slidably mounted on pillars 201 and 206. Pillars 201 and 206 are mounted on frame on which the other components of the apparatus are mounted. More or fewer pillars may be used, depending on the weight of processing tank 1. Raising means 211 changes the vertical position of processing tank 1. A hydraulic ram is shown. Other means of changing the vertical position of processing tank 1 known in the art can be used instead. Raising means 211 can be eliminated on smaller installations. Processing tank 1 can be raised or lowered by hand. Changing the position of processing tank 1 is always carried out when processing tank 1 is empty. Pointer 216 and scale 221 indicate the height of processing tank 1 to facilitate the adjustment process. After adjustment, processing tank 1 is locked in place with locking means 226 and 231. One end of pipe 236 is connected to orifice 11 in processing tank 1. The other end of pipe 236 is connected in a sliding arrangement to pipe 16. Pipe 16, which includes metering valve 46, leads to supply tank 26 (shown in FIG. 1). Alternatively, pipe 236 can be eliminated and all or part of pipe 16 can be made flexible to accommodate the vertical movement of processing tank 1.

The processing tank includes wall 96 which is shaped such that when the object to be coated is in the tank, and the hydrostatic head is set to the reference head, a coating of constant thickness is obtained. Alteratively, wall 96 can be purely parabola shaped and a displacement device (FIG. 6), suitably shaped so that a coating of constant thickness is obtained when the hydrostatic head is set to the reference head, can be used. Also, a processing tank with a shaped wall and a displacement device can be used together.

The coating process using the modified apparatus is the same as that described above in relation to using the apparatus to provide a constant coating thickness, except that the height of processing tank 1 is adjusted using raising means 211, pointer 216 and scale 221 to provide the desired coating thickness profile for the object to be coated. Once set, the height of processing tank 1 does not need to be changed unless the type of object to be coated is changed, or the coating thickness profile is changed.

A similar arrangement to that shown in FIG. 7 could be used to change the vertical position of supply tank 26 instead of changing the vertical position of processing tank 1. If desired, both tanks may be adjustable.

Figure 8:
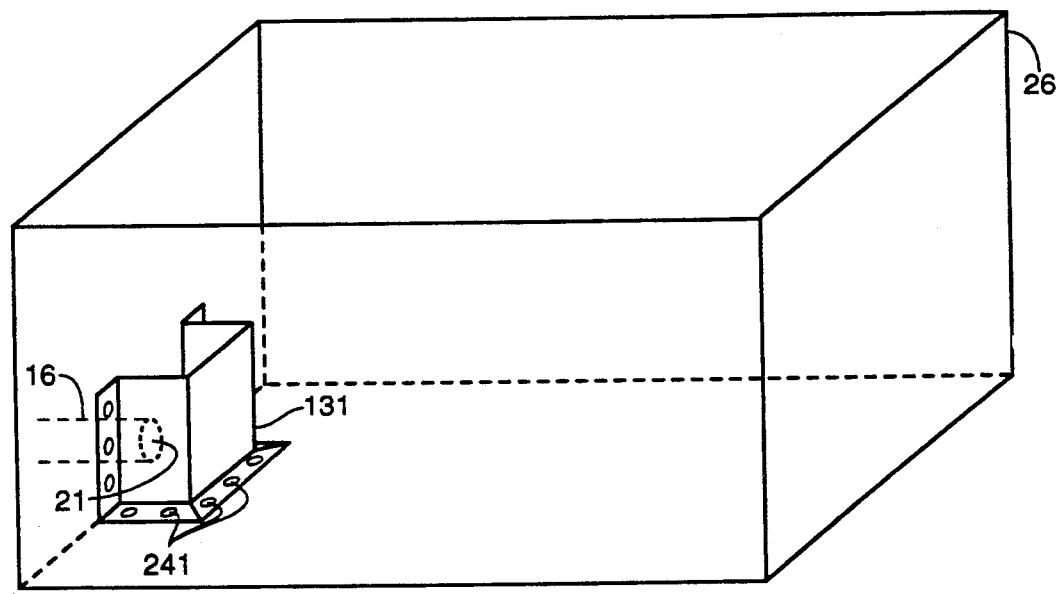
FIG. 8 shows a supply tank adapted to receive weirs of different heights to adjust the hydrostatic head.

As an alternative to changing the height of the processing tank or the supply tank, the supply tank can be fitted with a removable weir. As already described in connection with FIG. 5(a), weir 131 surrounds orifice 21 in supply tank 26 to provide a constant discharge level for coating liquid 31 draining into supply tank 26. Normally weir 131 would be permanently attached to supply tank 26 by, for example, welding. However, weir 131 could be attached to supply tank 26 by means of a plurality of screws or nuts 241, as shown in FIG. 8. A suitable gasket may have to be interposed between weir 131 and supply tank 26 to ensure a liquid-tight seal between weir 131 and tank 26. This arrangement allows the version of weir 131 that gives a constant coating thickness to be removed from tank 26 and replaced with a taller weir, which reduces the hydrostatic head, or a shorter weir, which increases hydrostatic head, to produce a progressively changing coating thickness as described above.

An alternative way of achieving a varying coating thickness is to change the surface area of the coating liquid in the processing tank instead of changing the hydrostatic pressure. This can be done by modifying the shape of the processing tank, or the displacement device, if used. Varying coating thickness by changing the surface area of the coating liquid in the processing tank enables a complex thickness profiles to be obtained. Coating thickness can increase or decrease several times during the draining process. Relatively abrupt changes of coating thickness are also possible with this method.

The design requirements described above for a processing tank or displacement device to provide a constant coating thickness are: (1) a parabolic relationship between the hydrostatic head and the surface area of the coating liquid in the tank must be maintained throughout the draining process; and (2) at every level of the coating liquid in the processing tank, the cross sectional area of the processing tank must be adjusted to compensate for the cross sectional area of the object to be coated at that level. These requirements can be modified to provide an increased or decreased coating thickness at different points in the draining process. Increasing the cross sectional area of the tank beyond that required to compensate for the cross sectional area of the object to be coated will reduce the rate at which the surface of the coating liquid drops, and decrease the coating thickness. Decreasing the cross sectional area of the tank has the opposite effect. The reason for this counter-intuitive result is, when the surface of the coating liquid drops more rapidly than the solvent can evaporate off the disks, a thicker layer of solvent containing the coating liquid remains on the disks. Then, when the solvent evaporates, a thicker coating remains that would have remained if the solvent had evaporated more fully during a slow coating liquid drop rate.

The thickness of the coating is easily controlled because, at any level of coating liquid in the processing tank, there is an inverse linear relationship between coating thickness and the surface area of the coating liquid in the processing tank, i.e., the difference between the cross sectional area of the processing tank and the cross sectional area of the object to be coated. Thus, in a processing tank designed to give a coating thickness of x, in which, at a certain level in the draining process, the surface area of the coating liquid is $A_x$, to obtain a coating thickness of y, the cross sectional area of the tank must be changed to provide a surface area of the coating liquid of $A_y$, where $A_y = A_x(x/y)$.

Designing a processing tank to provide a varying coating thickness on a given object to be coated is the same as designing a processing tank to provide a constant coating thickness on that same object, except that the position of wall 96, or the position of any of the other walls of the tank, is moved to provide the increase or decrease in the surface area of the coating liquid required to effect the desired changes in coating thickness. The uniformity of the different thicknesses of coating is determined by the number of different levels of the coating liquid at which the position of the wall(s) of the processing tank is calculated.

If a displacement device is used to provide a varying coating thickness, designing that displacement device is the same as designing a displacement device to provide a constant coating thickness on that same object except that the shape of the displacement device is changed to provide the increase or decrease in the surface area of the coating liquid required to effect the desired changes in coating thickness. The uniformity of the different thicknesses of coating is determined by the number of different levels of the coating liquid at which the cross sectional area of the displacement device is calculated. The processing tank in which the displacement device is used is designed to accommodate an object having a constant cross sectional area equal to the maximum cross sectional area of the object to be coated plus the maximum area increase required to effect the desired coating thickness profile.

The surface area changing and hydrostatic head changing techniques for varying coating thickness can be combined if is desired. For instance, they may both be used to impose some short distance variations (surface area method) on a coating thickness profile that changes progressively (hydrostatic head method) along the coating liquid drain axis of the object to be coated. The shaped wall and displacement device methods of varying the cross sectional area of the processing tank can also be combined, if desired.

As will be understood by those skilled in the art, many changes in many aspects of the coating apparatus described above may be made by the skilled practitioner without departing from the spirit and scope of the invention, which should be limited only as set forth in the claims which follow.

I claim:

1. Apparatus for evaporatively coating an object to be coated with a coating of a substantially constant thickness, comprising:
   a supply tank for providing a supply of coating liquid;
   a processing tank connected to receive fluid from and pass fluid to the supply tank, for receiving the object to be coated, said processing tank having
      an outlet for coating liquid positioned in the lower part of said processing tank;
      at least one wall shaped to provide a substantially parabolic relationship between the surface area of the coating liquid in said processing tank as bounded by the tank walls and the hydrostatic head between the coating liquid in said processing tank and the coating liquid in said supply tank, whereby the level of said coating liquid in said processing tank decreases at a substantially constant rate; and
      means for passing said coating liquid from said outlet to said supply tank.

2. The apparatus of claim 1 wherein at least one wall of the processing tank has a parabolic shape.

3. The apparatus of claim 1 wherein, at substantially any level of the coating liquid in the processing tank, said one wall of the processing tank is shaped to provide an increase in the cross sectional area of the processing tank equal to the cross sectional area of the object to be coated at that level.

4. The apparatus of claim 3 for coating an object having a constant cross sectional area, wherein, at substantially any level of the coating liquid, said one wall of the processing tank is shaped to increase the cross sectional area of the processing tank by a substantially constant amount.

5. The apparatus of claim 1 wherein the supply tank includes a means for providing a constant effective level of coating liquid in the supply tank as the level of the coating liquid in the processing tank decreases.

6. The apparatus of claim 5 wherein
   said means for passing the coating liquid from said outlet to said supply tank comprises a pipe connecting said outlet to an inlet in the supply tank located below the level of the surface of the coating liquid in the supply tank, and
   said means for providing a constant level comprises a weir surrounding the inlet to the supply tank.

7. The apparatus of claim 5 wherein
   said means for providing a constant effective level comprises U-bend means for discharging coating liquid into the supply tank above the level of the coating liquid in the supply tank, and
   said means for passing the coating liquid from said outlet to said supply tank comprises a pipe connecting said outlet to said U-bend means.

8. The apparatus of claim 5 wherein the parabolic relationship is $A_1/A_2 = \sqrt{(h_1/h_2)}$ wherein
   $A_1$ is the surface area of the coating liquid in the processing tank at a first level of the coating liquid in the processing tank,
   $A_2$ is the surface area of the coating liquid in the processing tank at a second level of the coating liquid in the processing tank,
   $h_1$ is the hydrostatic head between the coating liquid in the processing tank and the coating liquid in the supply tank at said first level of coating liquid in the processing tank, and
   $h_2$ is the hydrostatic head between the coating liquid in the processing tank and the coating liquid in the supply tank at said second level of coating liquid in the processing tank.

9. The apparatus of claim 1 wherein the parabolic relationship is $A_1/A_2 = \sqrt{(h_1/h_2)}$ wherein
   $A_1$ is the surface area of the coating liquid in the processing tank at a first level of the coating liquid in the processing tank,
   $A_2$ is the surface area of the coating liquid in the processing tank at a second level of the coating liquid in the processing tank,
   $h_1$ is the hydrostatic head between the coating liquid in the processing tank and the coating liquid in the supply tank at said first level of coating liquid in the processing tank, and
   $h_2$ is the hydrostatic head between the coating liquid in the processing tank and the coating liquid in the supply tank at said second level of coating liquid in the processing tank.

10. The apparatus of claim 1 for coating an object having a substantially constant cross sectional area,
    wherein the at least one wall of the processing tank is shaped to provide a substantially parabolic relationship between (1) the hydrostatic head between the coating liquid in the processing tank and the coating liquid in the supply tank, and (2) the surface area of the coating liquid in the processing tank with the object to be coated in the processing tank,
    the apparatus further comprising a displacement device insertable in the processing tank, the displacement device being shaped to provide, at substantially each level of coating liquid in the processing tank, a cross sectional area substantially equal to the difference between the cross sectional area of the object to be coated and the substantially constant cross sectional area of the object to be coated at said level of the coating liquid in the processing tank.

11. The apparatus of claim 10 wherein
    the object to be coated includes a fixture for locating the object to be coated in the processing tank, and
    the displacement device is attached to the fixture.

12. The apparatus of claim 1 for coating an object having a cross sectional area that is different at different levels of the coating liquid in the processing tank,
    wherein said one wall of the processing tank is shaped to provide an approximate parabolic relationship between the hydrostatic head between (1) the coating liquid in the processing tank and the coating liquid in the supply tank, and (2) the surface area of the coating liquid in the processing tank with the object to be coated in the processing tank,
    the apparatus further comprising a displacement device in the processing tank, the displacement device being shaped to have the cross sectional area, at substantially every level of coating liquid in the processing tank, that substantially corrects the errors in the approximate parabolic relationship provided by the processing tank between the hydrostatic head between the coating liquid in the processing tank and the coating liquid in the supply tank and the surface area of the coating liquid in the processing tank with the object to be coated in the processing tank.

13. The apparatus of claim 12 wherein
the object to be coated includes a fixture for locating the object to be coated in the processing tank, and the fixture includes the displacement device.

14. The apparatus of claim 1 for coating an object to be coated with a coating having a thickness that progressively increases or decreases along an axis of the object, further comprising
adjusting means for adjusting the hydrostatic head relative to the hydrostatic head that provides a constant thickness so as to provide said coating having a thickness that progressively increases or decreases along an axis of the object.

15. The apparatus of claim 14 wherein the adjusting means raises or lowers the supply tank relative to the position of the processing tank.

16. The apparatus of claim 14 wherein
the means for passing the coating liquid from said outlet to the supply tank comprises a pipe connecting said outlet to an inlet in the supply tank below the level of the surface of the coating liquid in the supply tank, and
said adjusting means comprises a weir of selectable height surrounding the inlet in the supply tank.

17. The apparatus of claim 14 wherein a coating thickness that increases as the level of coating liquid in the processing tank falls is provided by increasing the hydrostatic head relative to the hydrostatic head that provides a constant thickness coating.

18. The apparatus of claim 14 wherein a coating thickness that decreases as the level of coating liquid in the processing tank falls is provided by decreasing the hydrostatic head relative to the hydrostatic head that provides a constant thickness coating.

19. The apparatus of claim 14 wherein the object to be coated is placed in the processing tank with said axis vertical.

20. Apparatus for evaporatively coating an object to be coated with a desired coating having a predetermined thickness profile, comprising:
a supply tank for providing a supply of coating liquid;
a processing tank for receiving the object to be coated, said processing tank having
an outlet for coating liquid positioned in the lower part of said processing tank;
at least one wall shaped to provide a predetermined relationship between (1) the surface area of the coating liquid in the processing tank, and (2) the hydrostatic head between the coating liquid in the processing tank and the coating liquid in the supply tank, the predetermined relationship being selected to permit the formation of the desired coating having said predetermined thickness profile, whereby the surface level of the coating liquid in the processing tank decreases at a varying rate depending upon said predetermined relationship provided by the wall shape, which provides a coating having the predetermined thickness profile, said predetermined relationship being based on a parabolic relationship between the surface area of the coating liquid in the processing tank and the hydrostatic head between the coating liquid in the processing tank and the coating liquid in the supply tank, the parabolic relationship providing a coating having constant thickness, the predetermined relationship providing, at every level of the coating liquid in the processing tank,
a coating thickness that is thicker than the coating of constant thickness by decreasing the surface area of the coating liquid in the processing tank relative to the surface area required by the parabolic relationship, and
a coating thickness that is thinner than the coating of constant thickness by increasing the surface area of the coating liquid in the processing tank relative to the surface area required by the parabolic relationship; and
a means for passing said coating liquid from said outlet to said supply tank.

21. The apparatus of claim 20 wherein, at any level of the coating liquid in the processing tank, the surface area of the coating liquid required to provide a desired coating thickness is defined by the relationship $A_y = A_x(x/y)$, where
$A_x$ is the surface area of the coating liquid required by the parabolic relationship
$A_y$ is the surface area of coating liquid required to provide the desired coating thickness,
x is the thickness of the coating of constant thickness, and
y is the desired coating thickness.

22. Apparatus for evaporatively coating an object to be coated with a desired coating having a predetermined thickness profile, comprising:
a supply tank for providing a supply of coating liquid;
a processing tank for receiving the object to be coated, said processing tank having
an outlet for coating liquid positioned in the lower part of said processing tank;
at least one wall shaped to provide a predetermined relationship between (1) the surface area of the coating liquid in the processing tank, and (2) the hydrostatic head between the coating liquid in the processing tank and the coating liquid in the supply tank, the predetermined relationship being selected to permit the formation of the desired coating having said predetermined thickness profile, whereby the surface level of the coating liquid in the processing tank decreases at a varying rate depending upon said predetermined relationship provided by the wall shape, which provides a coating having the predetermined thickness profile wherein, at substantially every level of the coating liquid in the processing tank, said wall of the processing tank is shaped to increase the cross sectional area of the processing tank by the cross sectional area of the object to be coated at that level; and
a means for passing said coating liquid from said outlet to said supply tank.

23. The apparatus of claim 22 for coating an object to be coated having a constant cross sectional area, wherein, at substantially every level of the coating liquid, said wall of the processing tank is shaped to increase the cross sectional area of the processing tank by substantially the same amount.

24. The apparatus of claim 20 wherein the supply tank includes constant level means for providing a constant effective level of coating liquid in the supply tank as the level of the coating liquid in the processing tank decreases.

25. The apparatus of claim 20 wherein the parabolic relationship is $A_1/A_2 = \sqrt{(h_1/h_2)}$ where $A_1$ is the surface area of the coating liquid in the processing tank at a first level of the coating liquid in the processing tank, $A_2$ is the surface area of the coating liquid in the processing tank at a second level of the coating liquid in the processing tank, $h_1$ is the hydrostatic head between the coating liquid in the processing tank and the coating liquid in the supply tank at said first level of coating liquid in the processing tank, and $h_2$ is the hydrostatic head between the coating liquid in the processing tank and the coating liquid in the supply tank at said second level of coating liquid in the processing tank.

26. Apparatus for coating a first object to be coated having a cross sectional area that is different at different levels of the coating liquid in the processing tank with a coating having a predetermined thickness profile, comprising:

a supply tank for providing a supply of coating liquid;

a processing tank for receiving the object to be coated, said processing tank having an outlet for coating liquid positioned in the lower part of said processing tank;

at least one wall shaped to provide a predetermined relationship between (1) the surface area of the coating liquid in the processing tank, and (2) the hydrostatic head between the coating liquid in the processing tank and the coating liquid in the supply tank, the predetermined relationship being selected to permit the formation of the desired coating having said predetermined thickness profile, whereby the surface level of the coating liquid in the processing tank decreases at a varying rate depending upon said predetermined relationship provided by the wall shape, which provides a coating having the predetermined thickness profile, wherein the at least one wall of the processing tank is shaped to provide a substantially parabolic relationship between (1) the hydrostatic head between the coating liquid in the processing tank and the coating liquid in the supply tank, and (2) the surface area of the coating liquid in the processing tank with a second object to be coated having a substantially constant cross sectional area; and a displacement device for coating the first object of non-uniform cross sectional area less than the cross sectional area of the first object, insertable into the processing tank, the displacement device being shaped to provide, at substantially every level of coating liquid in the processing tank, a cross sectional area substantially equal to the difference between the cross sectional area of the second object and the cross sectional area of the first object at the level of the coating liquid in the processing tank.

* * * * *